(12) United States Patent
Peysson et al.

(10) Patent No.: US 8,563,483 B2
(45) Date of Patent: Oct. 22, 2013

(54) MINERAL-BASED DRILLING FLUID AND DRILLING METHOD

(75) Inventors: Yannick Peysson, Rueil Malmaison (FR); David Pasquier, Suresnes (FR)

(73) Assignees: IFP, Rueil-Malmaison (FR); Total S.A., Courbevoie (FR)

( * ) Notice: Subject to any disclaimer, the term of this patent is extended or adjusted under 35 U.S.C. 154(b) by 546 days.

(21) Appl. No.: 12/746,930

(22) PCT Filed: Dec. 4, 2008

(86) PCT No.: PCT/FR2008/001693
§ 371 (c)(1),
(2), (4) Date: Sep. 9, 2010

(87) PCT Pub. No.: WO2009/101290
PCT Pub. Date: Aug. 20, 2009

(65) Prior Publication Data
US 2010/0326728 A1    Dec. 30, 2010

(30) Foreign Application Priority Data

Dec. 10, 2007    (FR) ..................................... 07 08587

(51) Int. Cl.
*C09K 8/03*    (2006.01)

(52) U.S. Cl.
USPC .............................. 507/140; 507/269; 175/65

(58) Field of Classification Search
USPC .................... 507/140, 269; 175/65; 166/305.1
See application file for complete search history.

(56) References Cited

U.S. PATENT DOCUMENTS

| 2,337,296 | A | | 12/1943 | Kennedy et al. | |
| 4,569,770 | A | | 2/1986 | Martins | |
| 5,398,758 | A | * | 3/1995 | Onan et al. | 166/292 |
| 2003/0236171 | A1 | * | 12/2003 | Nguyen et al. | 507/100 |
| 2009/0124521 | A1 | | 5/2009 | Bradbury et al. | |
| 2009/0186781 | A1 | * | 7/2009 | Zhang | 507/140 |

FOREIGN PATENT DOCUMENTS

| GB | 2 315 505 | | 2/1998 |
| WO | WO 9803609 A1 | * | 1/1998 |
| WO | WO 2004/037947 A1 | | 5/2004 |

\* cited by examiner

*Primary Examiner* — Alicia Toscano
(74) *Attorney, Agent, or Firm* — Antonelli, Terry, Stout & Kraus, LLP.

(57) ABSTRACT

A high-temperature drilling fluid is disclosed based on brine and on a mixture of solids of controlled grain size, with water, dissolved salts and insoluble mineral solids comprising at least in part a weighting material of a grain size such that its D50 ranges between 1 and 25 μm and in part colloids of a grain size such that its D50 ranges between 0.2 and 2 μm. The total volume fraction of the solids ranges between 30 and 50% in relation to the total volume, and the total volume comprises at least 10% by volume of the colloids.

3 Claims, 2 Drawing Sheets

MINERAL-BASED DRILLING FLUID AND DRILLING METHOD

BACKGROUND OF THE INVENTION

Field of the Invention

The present invention relates to a drilling fluid allowing operation in very deep zones, at high temperature and high pressure. The constituents of the fluid are inert up to very high temperatures (up to 250-300° C.) and its density can be adjusted to above 2000 kg/m$^3$.

Drilling deep oil reservoirs may require using a drilling fluid that can provide flow, well stability and cuttings removal, at temperatures well above 200° C. Conventional drilling fluids or muds generally consist of various additives (polymers, surfactants, etc.) that degrade at such temperatures.

Silica-based or alumina-based mineral gels have already been widely studied for their particular properties. Silica microspheres are notably used as additives in cement slurries to adjust their mechanical properties.

SUMMARY OF THE INVENTION

The present invention thus relates to a high-temperature drilling fluid based on brine and on a mixture of solids of controlled grain size in that it consists of water, dissolved salts and insoluble mineral solids comprising at least in part a weighting material of a grain size such that its D50 ranges between 1 and 25 μm and in part colloids of a grain size such that its D50 ranges between 0.2 and 2 μm, in that the total volume fraction of the solids ranges between 30 and 50% in relation to the total volume, and in that the total volume comprises at least 10% by volume of the colloids.

The present invention provides a drilling fluid that can fulfill all the functions of a fluid of a high-temperature type, notably hydrostatic pressure and cleaning, mainly obtained by adjusting the density and the viscosity, in a very high temperature and high pressure context.

The formulation of the drilling fluid according to the invention is based on the use of inert additives in the temperature range being considered.

The drilling fluid may comprise no thermally degradable viscosifying additives, either of natural or synthetic polymeric additive type.

The weighting material part can consist of microbarite. It can also consist of other weighting materials, for example Mn3O4, carbonates, insofar as their grain size corresponds to the invention.

The colloid part can consist of microsilica or microalumina, or mixtures thereof.

The pH value of the fluid can be above 7.5.

The total volume fraction of the solids can range between 35 and 45%.

The invention also relates to a method of drilling very deep underground reservoirs, using a drilling fluid consisting of water, dissolved salts and a volume fraction of insoluble mineral solids comprising at least in part a weighting material of a grain size such that its D50 ranges between 1 and 25 μm and in part colloids of a grain size such that its D50 ranges between 0.2 and 2 μm, the rheologic characteristics of the fluid being set by adjusting the total volume fraction of the solids, and the density of the fluid being set by adjusting the proportion of the weighting material part in relation to the colloid part.

According to the drilling method, the fluid can comprise at least 10% by volume of colloids in relation to the total volume.

According to the method, no additive thermally degradable from 180° C., notably viscosifiers, is added.

BRIEF DESCRIPTION OF THE DRAWINGS

Other features and advantages of the present invention will be clear from reading the description hereafter of non-limitative examples illustrated by the accompanying figures, wherein.

DETAILED DESCRIPTION

The drilling fluid according to the invention must be able to have a relatively high density, considering the drilling depth. Thus, the barite concentration can be high. At least one colloidal phase of microsilica or microalumina allows creation of a gelled network in order to obtain stability of the composition whose density is thus adjusted.

The base fluid is a brine, for example based on CaCl$_2$ at high concentration allowing preventing property modifications in case of water or brine inflow while drilling. Other salts or mixtures thereof can be used (tests with NaCl and CaCl$_2$ have been carried out).

The barite volume fraction is denoted by $$\phi = \frac{V_{Barite}}{V_{Total}}$$

and the silica (or alumina) volume fraction is denoted by $$\xi = \frac{V_{minéral}}{V_{Total}}.$$

The total volume fraction of solids is denoted by $\phi_m = \phi + \xi$.

The mud density is a function of $\phi$ or $\xi$ or $\phi_m$ and $\phi$ $$\rho_{Mud} = \rho_{saumure}(1-\phi-\xi) + \rho_{barite}\phi + \rho_{solide2}\xi$$

$$\rho_{Mud} = \rho_{saumure}(1-\phi_m) + \rho_{barite}\phi + \rho_{solide2}(\phi_m-\phi)$$

Therefore, for a given density $\rho_{Mud}$, a maximum amount of solids $\phi_m$ in the system can be set and the fraction ratio, with $\phi$ and $\xi$, between the two solids can be adjusted.

This point is important because, in the first order, it can be considered that the rheology of the drilling fluid is mainly controlled by $\phi_m$ and the density by $\phi_m$ and $\xi$. Thus, to a certain extent, one and the other can be controlled independently, which is a definite advantage of this kind of system.

The grain size of the various solid constituents has to be well controlled and rather close. In fact, stability of the suspensions is provided by controlling the size of their constituents and the surface properties.

Figure 1A:
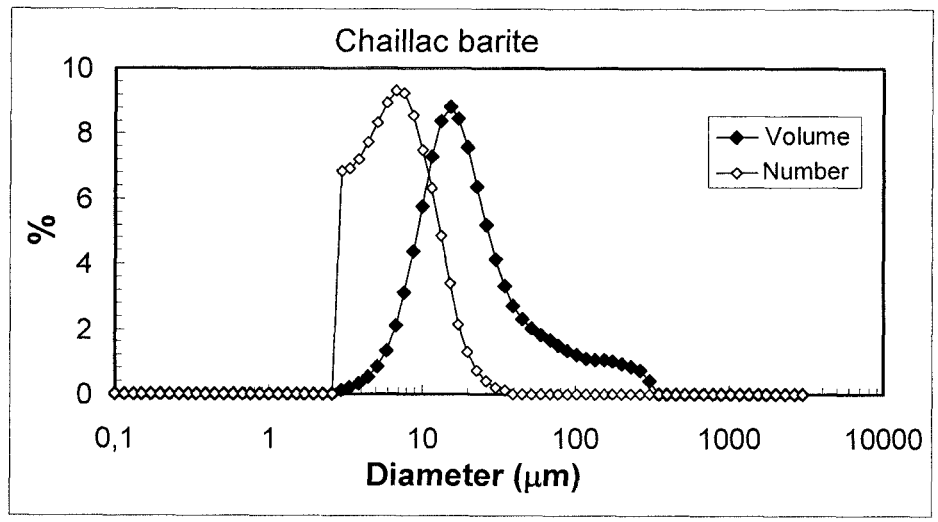
FIGS. 1a and 1b give the grading curves of the minerals used in the examples.
Figure 1B:
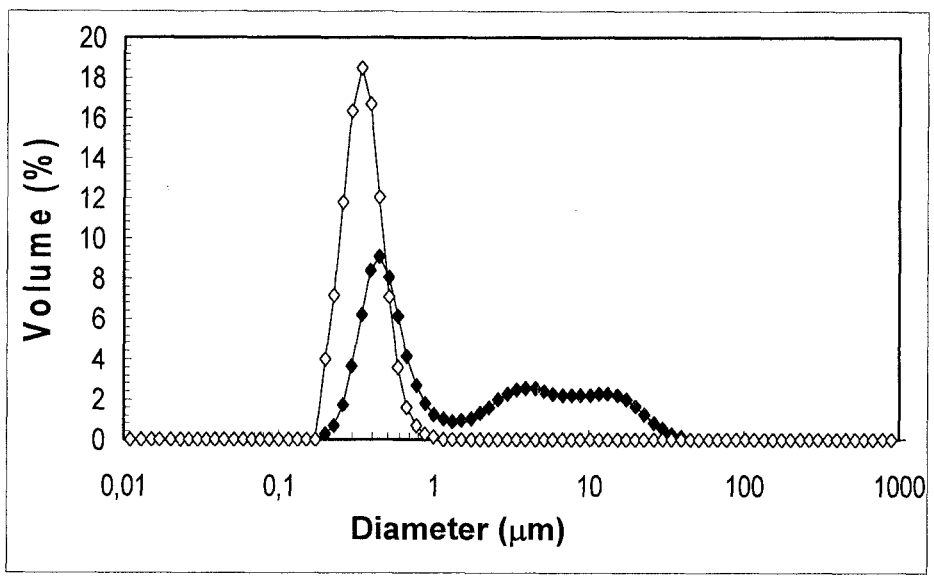

Microbarite whose grain size mainly ranges between 1 and 50 μm is thus used, and the size of the other colloidal phase (silica, alumina) ranges between 0.1 and 3 μm. The grading curves are given in FIGS. 1a and 1b respectively for the Chaillac barite and the microsilica used. It is clear that solids of very close grain size distribution are also suitable. One can refer to the D50 values known to the person skilled in the art with, for the weighting minerals, for example barite with a D50 ranging between 1 and 25 μm and for microsilica a D50 ranging between 0.2 and 2 μm.

The weighting material used can be manganese tetraoxide (Mn3O4, for example, marketed under the trade name Micromax™ by the Elkem Materials Company) or carbonates.

It is necessary to introduce a minimum volume fraction of mineral dispersion to obtain a gel. This proportion is 12% for the silica dispersion and 10% for microalumina.

Thus, for example, by setting the total solid fraction at 45%, the mud density can be varied from 1.69 to 2.32 by varying φ from 0 to 33% (maximum fraction of weighting material so as to have at least 12% silica remaining in relation to the total volume).

Controlling the pH value and the ionic strength (salt concentration) of the dispersion allows controlling the colloidal interactions. However, these parameters are imposed partly by the use of the fluid as the drilling mud, for which the salt concentration generally is of the order of 2 mol/l, or more.

For silica gel, the pH value is adjusted to pH=8.5 by adding $CaOH_2$. The surface charges of the silica microspheres are thus controlled. The silica dispersions give very stable physical gels at pH=8-9 and at a higher ionic strength (salt concentration above 0.1 mol/l). The present invention comes within this range.

A threshold rheologic fluid of homogeneous aspect is thus obtained. It has been observed that the fluid has no supernatant water, even after a very long time (above 48 h).

The dispersed silica phase forms a gel by Van der Waals interaction between the particles. At pH=8.5, the silica microspheres have negative charges, but the electrostatic interactions are shielded by the presence of $Ca^{2+}$ ions.

The stability was confirmed by a Turbiscan study of the fluid according to the invention. No liquid phase appears in the long time.

The same behavior is observed for the alumina phases. The pH value is naturally stabilized at 7.5, and above 10% volume fraction of microalumina, the gel aspect is found again.

Tests were also carried out at pH=3.5. These mixtures also lead to a homogeneous phase, but which leads to the appearance of a clear fluid after 20 h under static conditions. However, these fluids have, over this period, sufficiently interesting properties for application as a drilling fluid.

It is thus possible to formulate a homogeneous fluid having no long-time phase separation or moderate phase separation.

Figure 2:
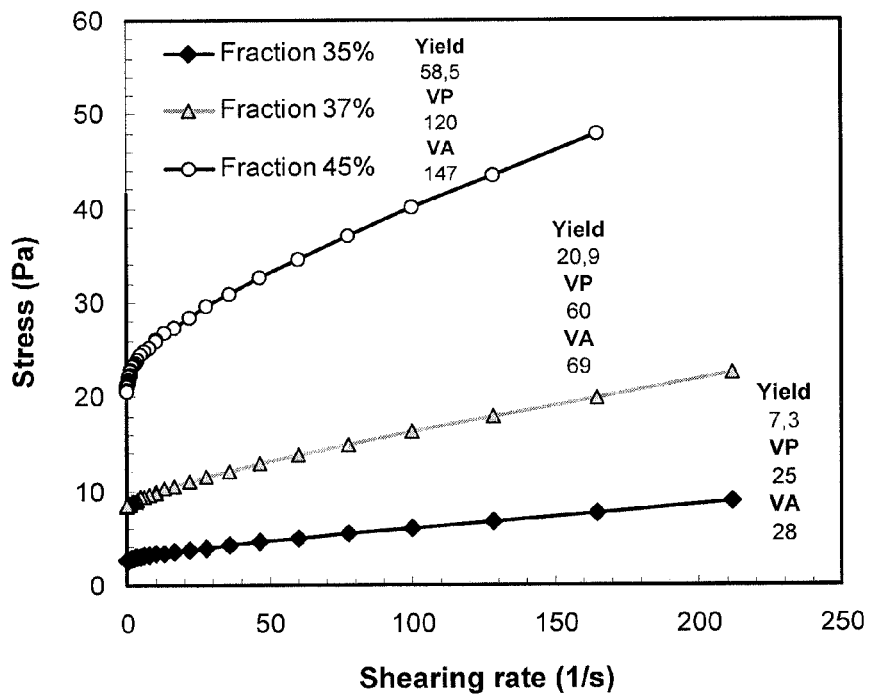
FIG. 2 shows the rheologic variations as a function of the total volume fraction of solids.

The mixture obtained has a rheology compatible with the use of a drilling mud as shown, in FIG. 2, by the Yield (YV in lbs/100 ft² or threshold stress—conversion: lbs/100 ft²× 0.48=Pa), VA (Apparent Viscosity in centiPoise—conversion: cP×0.001=Pa·s), VP (Plastic Viscosity in centiPoise) values calculated from rheologic measurements.

Various rheologies as a function of the total volume fraction (35%, 37% and 45%) of solids for a barite/silica mixture at pH=3 are illustrated in FIG. 2.

It can be clearly seen that the change in the total amount of solids leads to a change in the rheology of the system. There definitely is an adjustment variable on the rheology. Furthermore, an increase in the viscosity of the mixture and in the threshold stress (YV) as a function of the total volume fraction of solids is observed. In order to keep products of suitable viscosity, the total volume fraction of solid has to be set in an interval ranging between 35% and 45%, and at least 10% microsilica, or equivalent in grain size, in relation to the total volume.

Temperature Stability

The mixture was subjected several times to a temperature of 200° C. for 24 h in a cell at a pressure of 20 bars. The fluid flows out with an aspect identical to the initial aspect.

Figure 3:
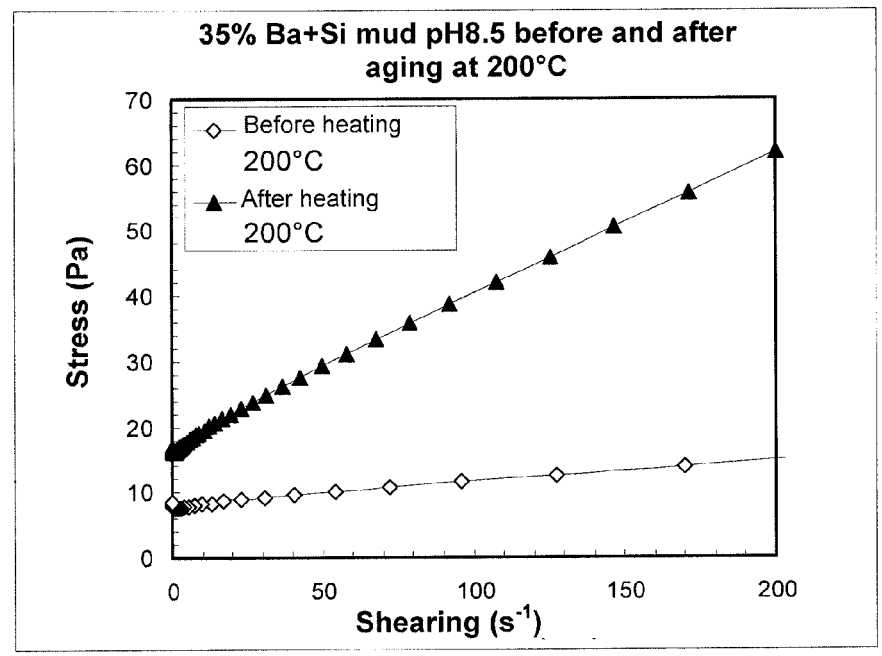
FIG. 3 illustrates the temperature stability of the fluid according to the invention.

In order to confirm the visual tests, before/after rheologic tests are carried out; they show that the fluid keeps Herschell Bulkley type threshold fluid properties, but with a slight change in the threshold stress value and in the viscosity parameters (consistency and rheofluidification index). FIG. 3 shows the two rheograms obtained before and after the thermal test. An increase in the rheologic parameters, notably a doubling of the threshold stress, is noted. However, this evolution remains quite compatible with the use of this fluid. Furthermore, the rheologic measurement after the thermal test was carried out without any mixing. The sample is measured as it is after 24 h in the cell, part of the viscosity increase is thus due to gelling over time.

The invention claimed is:

1. A high-temperature drilling fluid, consisting of water, dissolved salts and insoluble mineral solids including at least in part a weighting material of a grain size such that a D50 range thereof is between 1 and 25 μm and colloids of a grain size such that a D50 range thereof is between 0.2 and 2 μm, with a total volume fraction of the solids ranging between 30 and 50% in relation to the total volume, and a total volume comprises at least 10% by volume of the colloids, and wherein the weighting material consists of microbarite, manganese tetraoxide, or carbonates, and wherein the colloids consists of microsilica or microalumina, or mixtures thereof.

2. A drilling fluid as claimed in claim 1, comprising no thermally degradable viscosifying additive.

3. A drilling fluid as claimed in claim 2, wherein a total volume fraction of solids ranges between 35 and 45%.

* * * * *